(12) United States Patent
Herrera Caballero et al.

(10) Patent No.: US 10,708,981 B2
(45) Date of Patent: Jul. 7, 2020

(54) INDUCTION HEATING PLATE

(71) Applicant: Aktiebolaget SKF, Gothenburg (SE)

(72) Inventors: Alberto Javier Herrera Caballero, Utrecht (NL); Ton Ramaker, Delft (NL)

(73) Assignee: AKTIEBOLAGET SKF, Gothenburg (SE)

( * ) Notice: Subject to any disclaimer, the term of this patent is extended or adjusted under 35 U.S.C. 154(b) by 368 days.

(21) Appl. No.: 15/872,178

(22) Filed: Jan. 16, 2018

(65) Prior Publication Data

US 2018/0279421 A1    Sep. 27, 2018

(30) Foreign Application Priority Data

Mar. 27, 2017    (GB) .................................. 1704805.9

(51) Int. Cl.
| | |
|---|---|
| *H05B 6/06* | (2006.01) |
| *H05B 6/44* | (2006.01) |
| *H05B 6/10* | (2006.01) |
| *F16C 33/64* | (2006.01) |
| *F16C 35/063* | (2006.01) |
| *H05B 6/14* | (2006.01) |

(52) U.S. Cl.
CPC .............. *H05B 6/06* (2013.01); *F16C 33/64* (2013.01); *F16C 35/063* (2013.01); *H05B 6/101* (2013.01); *H05B 6/14* (2013.01); *H05B 6/44* (2013.01); *F16C 2226/14* (2013.01); *Y02P 10/253* (2015.11)

(58) Field of Classification Search
CPC . H05B 6/06; H05B 6/101; H05B 6/14; H05B 6/44; F16C 35/64; F16C 35/063
See application file for complete search history.

(56) References Cited

U.S. PATENT DOCUMENTS

| | | | |
|---|---|---|---|
| 5,808,280 A | 9/1998 | Gaspard | |
| 2003/0155349 A1* | 8/2003 | Matsuo | .................... H05B 6/06 219/664 |

(Continued)

FOREIGN PATENT DOCUMENTS

| | | |
|---|---|---|
| EP | 2728965 A1 | 5/2014 |
| JP | 5216153 B2 | 6/2013 |

*Primary Examiner* — Jeremy Carroll
(74) *Attorney, Agent, or Firm* — Garcia-Zamor Intellectual Property Law, LLC; Ruy Garcia-Zamor; Bryan Peckjian

(57) ABSTRACT

An induction heating device providing a support plate with an upper surface for receiving a side face of a bearing. A plurality of concentrically arranged induction coils provided at an underside of the support plate, and connected to and selectively powered by a generator. Temperature sensors arranged on the upper surface of the support plate at different radial distances from a center axis of the concentric coils. A control unit receives and monitors a temperature signal from each of the temperature sensors, which receives and processes a signal indicative of a load on each coil, when selectively powered, to identify a first coil that is electromagnetically coupled to an inner ring and a second coil that is electromagnetically coupled to an outer ring. The control unit configured to select a first and a second temperature sensor associated with the first and second coils respectively, and to execute a heating cycle.

14 Claims, 3 Drawing Sheets

(56) References Cited

U.S. PATENT DOCUMENTS

| | | | |
|---|---|---|---|
| 2014/0144904 A1* | 5/2014 | Nakatsu | H05B 6/101 219/650 |
| 2016/0021706 A1* | 1/2016 | Okamoto | H05B 6/42 219/619 |
| 2016/0169751 A1* | 6/2016 | Zenzen | H05B 6/06 374/184 |
| 2020/0022226 A1* | 1/2020 | Wilson | G01K 1/14 |

* cited by examiner

INDUCTION HEATING PLATE

CROSS-REFERENCE

This application claims priority to British patent application no. 1704805.9 filed on Mar. 27, 2017, the contents of which are fully incorporated herein by reference.

TECHNOLOGICAL FIELD

The present invention relates to a device comprising concentrically arranged induction coils for heating a rolling element bearing, by inducing eddy currents in an inner ring and in an outer ring of the bearing.

BACKGROUND

An example of an induction heating device for heating a rolling element bearing is disclosed in EP2728965. The device includes at least two induction coils, plus first and second temperature sensors for measuring the temperature of the bearing inner and outer rings respectively. The device is configured to adjust the power combination supplied to the induction coils if a maximum temperature difference between the bearing rings is exceeded.

Induction heating is also widely applied in cooking appliances. An example of a device comprising a heating plate with at least two concentric induction coils, each supplied by a separate generator, is disclosed in U.S. Pat. No. 5,808,280. The device includes a controller which is configured to cause the generators to operate according to a sequential order, starting with the generator that supplies the innermost coil and progressing to the outermost coil that is covered by a cooking receptacle, based on a detection step in which the presence of a load on each induction coil is determined. The determination is made as a function of the current passing through the induction coil in question. The device further includes a thermal probe for measuring the temperature of the cooking receptacle, which measurement can be used by the controller to adjust the heating cycle.

There is still room for improvement.

SUMMARY

The present invention resides in an induction heating device comprising a support plate with an upper surface for receiving a side face of a bearing having an inner ring and an outer ring. A plurality of concentrically arranged induction coils are provided at an underside of the support plate, whereby each induction coil is connected to and selectively powered by a generator. A number of temperature sensors are arranged on an upper surface of the support plate at different radial distances from a center axis of the concentric coils, such that each coil is associated with at least one temperature sensor that overlaps the coil or is in close radial proximity thereto. The device further comprises a control unit which receives and monitors a temperature signal from each of the temperature sensors and which is configured to monitor a load on each coil, when powered, to identify a first coil that is covered by the inner ring and a second coil that is covered by the outer ring. The control unit is further configured to select a first temperature sensor and a second temperature sensor that are associated with the first and second coils respectively, and to execute a heating cycle in which at least the first and second coils are controlled based on the temperature signals from the first and second temperature sensors.

The heating device may comprise at least three concentric induction coils, preferably four or more, to enable bearings of various sizes to be heated on the same device. Each coil is associated with at least one temperature sensor, whereby the same temperature sensor can be defined as proximate to two neighboring coils. Thus, in some examples, the device has a smaller number of temperature sensors than coils. In other examples, the device has a number of temperature sensors that is at least equal to the number coils. Preferably, the device has more temperature sensors than coils, e.g. two or more sensors per coil, at different radial distances from the center axis, to provide an accurate temperature profile across the bearing when it is placed on the support plate.

Suitably, the temperature sensors are arranged in a straight line that extends from the center axis. In a further development, the device comprises a first set of temperature sensors arranged in a first straight line that extends from the centre axis and further comprises at least a second set of temperature sensors arranged in a second straight line, angularly spaced from the first straight line. A second set of temperature sensors improves the accuracy of temperature measurement.

In a further development, the device comprises first, second and third sets of temperature sensors arranged in first, second and third straight lines that extend from the centre axis. Suitably, each set of temperature sensors comprises the same number of sensors, whereby the spacing between adjacent sensors is identical. This enables a comparison of the temperature measured at the same radial distance from the centre axis, at three angular positions. Consequently, it is possible to detect if the bearing axis is offset from the centre axis of the device. This information may be used in the control of the heating cycle. Alternatively, upon detecting an offset after the heating cycle has begun, the control unit may be configured to discontinue the cycle and prompt the user of the device to correct the misalignment.

In a preferred example, each of the one or more sets of temperature sensors is formed by an NTC strip comprising linearly spaced NTC resistors.

In one embodiment, the induction heating device has only one generator and the control unit is configured to power the identified first and second coils sequentially in order to execute the heating cycle. Alternatively, the device may have two or more generators, whereby each generator can selectively power one or more coils.

The control unit executes a heating cycle that is designed to raise the temperature of the inner ring to a suitable value (e.g. 110° C.) to enable shrink-fit mounting on a shaft. To prevent a temperature difference between the inner and outer rings that could damage the bearing (e.g. 30° C.) both of the bearing rings are heated. In a preferred embodiment, the heating cycle executed by the control unit comprises powering of the identified first and second coils, to raise the temperature measured by the selected first temperature sensor to a predetermined value, without exceeding a maximum allowable temperature difference between the received signals from the selected first and second temperature sensors.

In a further development, the control unit is configured to initiate the heating cycle and then verify that the correct first coil and the correct second coil have been identified. Suitably, at least the temperature signals from the selected first and second temperature sensors are monitored, to determine if these signals are exhibiting temperature behavior that would be expected if the inner and outer bearing rings were indeed covered by and in electromagnetic coupling with the first and second coils respectively.

The control unit may be configured to monitor the temperature signal from each of the sensors in the one or more sets, to obtain a temperature profile across the support plate and across the bearing at a particular instant. The temperature measured by the first and second temperature sensors are compared against other measured temperatures within the obtained temperature profile, to determine if expected behavior is being exhibited.

The control unit may be further configured to monitor changes in the signal from the first and second temperature sensors over time, to determine if expected behaviour is being exhibited.

If the monitored temperature signals are behaving as expected, the heating cycle is continued. If unexpected behaviour is detected, the control unit is suitably configured to initiate a new heating cycle with a different first coil and/or a different second coil, and repeat the verification process until the correct first and second coils have been identified.

If the bearing has a metal cage for retaining rolling elements, or if it is fitted with a shield, it could happen that when the bearing is placed on the support plate, an induction coil is radially located between the inner and outer rings. This could cause excessive, undesirable heating of the cage or shield. Advantageously, the control unit may be further configured to detect if any of the temperature sensors measures an excessive temperature that exceeds a predetermined maximum value and to deactivate at least the coil associated with the measured excessive temperature.

Thus, an induction heating device according to invention enables bearings of various sizes and designs to be heated in a safe and straightforward manner Other advantages of the invention will become apparent from the following detailed description and accompanying drawings.

BRIEF DESCRIPTION OF THE DRAWINGS

FIG. 1b shows a top view of the arrangement from FIG. 1a;

FIG. 2 shows an example of an inductive load measurement for each concentric coil that might be obtained with the arrangement from FIG. 1a;

DETAILED DESCRIPTION

Figure 1A:
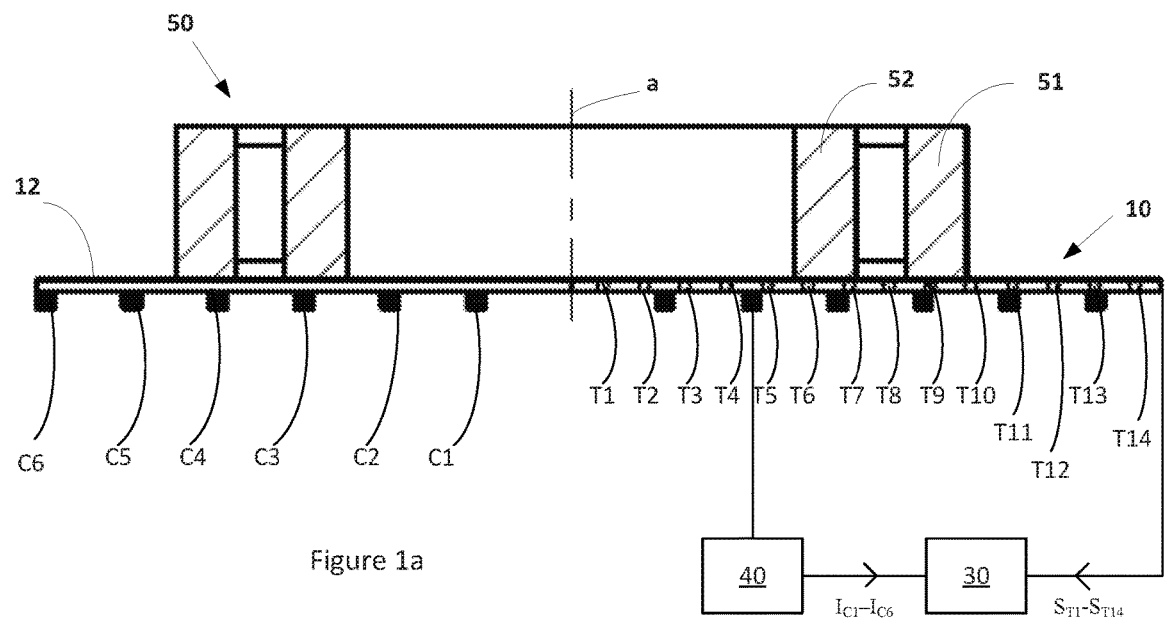
FIG. 1a shows a side view of a bearing heater according to the invention, comprising concentrically arranged induction coils, with a bearing placed on the device.
Figure 1B:
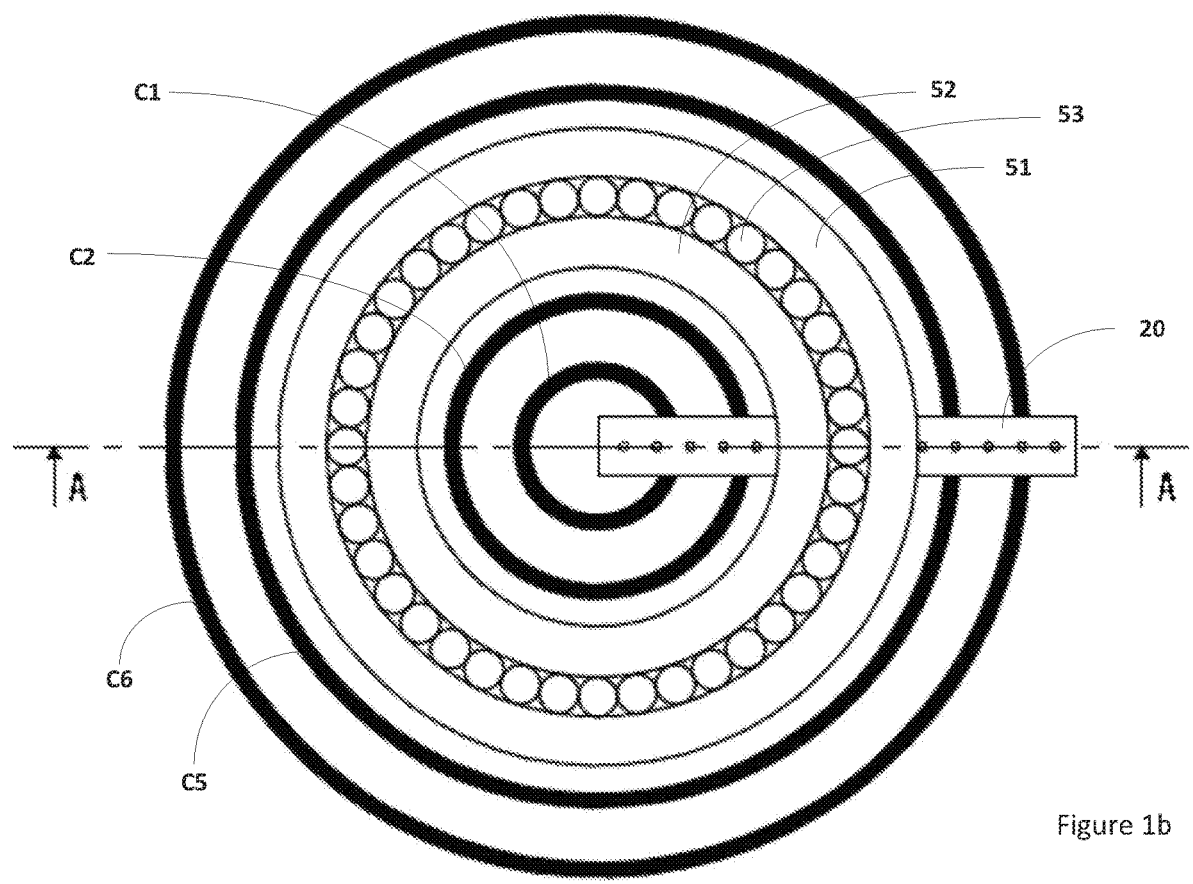

An example of a bearing heater according to the invention is schematically shown in a side view in FIG. 1a and in a top view in FIG. 1b. The heater 10 comprises a support plate 12 for receiving a side face of a rolling element bearing 50, having an outer ring 51, inner ring 52 and at least one row of rolling elements 53. The heater 10 further comprises a plurality of induction heating coils C1, C2, ... C6 arranged concentrically about a centre axis 15, at an underside of the support plate 12. At a top side of the support plate, a plurality of temperature sensors T1, T2, ... T14 are arranged in a straight line at increasing radial distances from the centre axis 15. In the depicted example, the temperature sensors T1-T14 are NTC-type thermistors (Negative Temperature Coefficient) arranged on an NTC strip 20. The sensors may have an even linear spacing.

The multiple concentric coils C1-C6 enable induction heating of bearings of various sizes. Due to the multiple temperature sensors T1-T14 at different radial distances, it can be ensured that regardless of the bearing size, at least one temperature sensor will be in contact with the inner ring 51 and at least one temperature will be in contact with the outer ring 51.

The NTC strip 20 is connected to a control unit 30, which is configured to receive and monitor a temperature signal ST1, ST2, ... ST14 from each of the temperature sensors T1-T14. In the depicted example, where several (fourteen) sensors are arranged with a relatively small radial spacing in between, the control unit is thus able to measure a temperature profile across the bearing 50 and across the support plate 12, which has advantages that will be described later.

The heater further comprises an alternating current generator 40 to which each coil C1-C6 is connected (NB only one connection to coil C2 is shown in FIG. 1a, so as not to obscure the drawing). The generator 40 is controlled by the control unit 30, which is configured to selectively power one coil at a time and to determine the load on a coil when it is being powered. Preferably the current through each coil is measured and the corresponding signal IC1, IC2, ... IC6 is received and processed by the control unit 30 in order to determine the load. In the depicted embodiment, the heater has only one generator. In other embodiments, the heater may have two or more generators for powering two or more groups of coils.

The control unit 30 is suitably programmed to execute a heating cycle that will raise the temperature of the bearing inner ring 51 to a value that enables the bearing to be shrink-fitted onto a shaft via thermal expansion and contraction. Typically, the inner ring is heated to a temperature of around 110° C. The heating cycle includes induction heating of both the inner ring 51 and the outer ring 52, to prevent an excessive temperature difference between the bearing rings that could damage the bearing.

Consequently, the control unit 30 of the heater is configured to identify a first one of the coils that is covered by the inner ring 51 and a second one of the coils that is covered by the outer ring 52.

Figure 2:
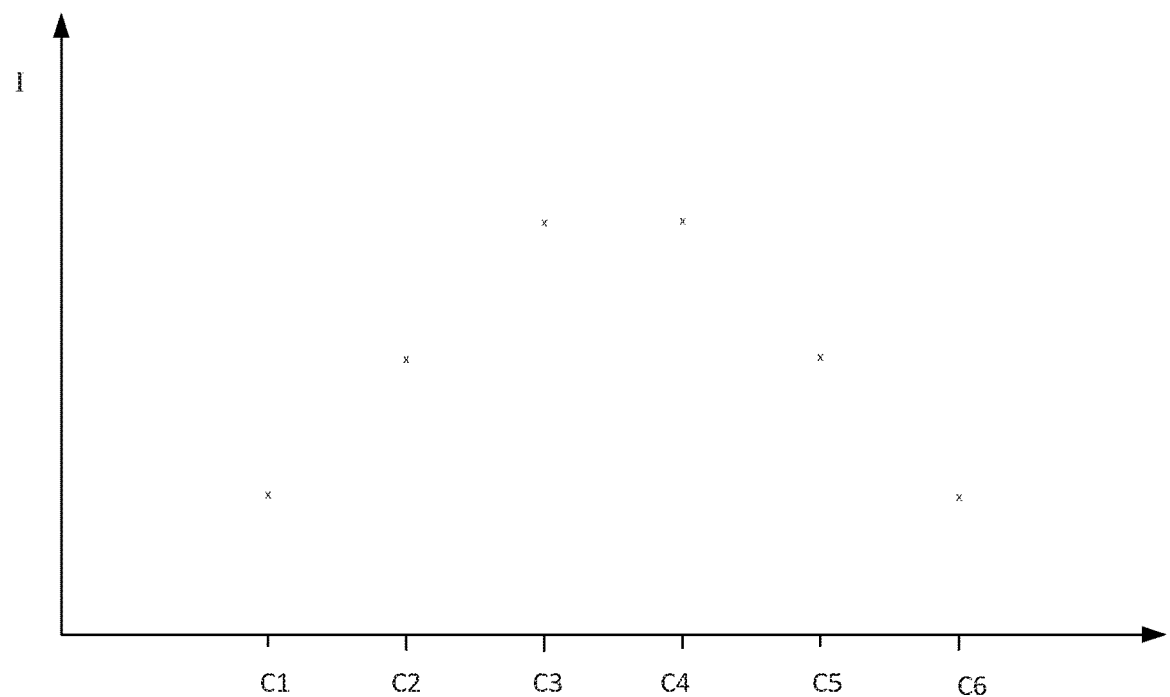

Initially, this may be done by consecutively powering each of the coils, for example starting with the innermost coil C1 and working radially outwards, and measuring the current through each coil when it is being powered. The measured current is representative of the degree of electromagnetic coupling between a coil and an inductive load, i.e. a bearing ring. FIG. 2 shows an example of a plot that might be obtained for the arrangement depicted in FIGS. 1a and 1b, whereby the y-axis shows the measured current I and the x-axis shows the concentric coils C1-C6.

Coils C1 and C6 are relatively far away from the inner and outer bearing rings respectively and there is little or no electromagnetic coupling. The coil C2 is relatively closer to the inner ring 51 and the coil C5 is relatively closer to the outer ring 52, and the degree of electromagnetic coupling is greater. Coil C3 is covered by the inner ring 51 and coil C4 is covered by the outer ring 51, leading to maximum magnetic coupling and measurement of the two highest current levels. In this example, two coils with the highest two measured currents are identified. The radially inner of the two coils i.e. coil C3 is identified as the first coil for heating the inner ring and the radially outer of the two coils i.e. coil C4 is identified as the second coil for heating the outer ring.

In other examples, where the bearing is a different size, it could happen that e.g. coil C3 is at least partly covered by the inner ring and coil C5 is at least partly covered by the outer ring. In this case, the intermediate coil—coil C4—may experience the highest load, due to electromagnetic coupling with the rolling elements, and a cage for the rolling elements that could be made of metal (steel or brass) and with both rings. It is not desirable to excessively heat the rolling elements and cage. Thus, when a load is detected in three consecutive coils and the highest load is detected in the center coil of the three coils, the control unit may be programmed to select the innermost of the three coils as the first coil for heating the inner ring and to select the outermost of the three coils as the second coil for heating the outer ring.

After selection of the first and second coils, a first temperature sensor is identified as the sensor for measuring the temperature of the inner ring 51 and a second temperature sensor is identified as being the temperature sensor for measuring the temperature of the outer ring 52. Each of the coils C1-C6 is associated with one or more temperature sensors which are radially proximate to the coil, i.e. positioned at a similar radial distance from the centre axis a. In this example, the three innermost temperature sensors T1, T2, T3 are associated with the innermost coil C1. The coil C2 is associated with temperature sensors T4 and T5. The coil C3 is associated with temperature sensors T6, T7 and T8. The coil C4 is associated with temperature sensors T8, T9 and T10. The coil C5 is associated with temperature sensors T10, T11 and T12. The coil C6 is associated with temperature sensors T12, T13 and T14.

In the arrangement shown in FIGS. 1a and 1b, where coils C3 and C4 have been identified as the first and second coils, one of the temperature sensors associated with each coil is identified as the corresponding first temperature sensor (for measuring the temperature of the inner ring) and second temperature sensor (for measuring the temperature of the outer ring). Preferably, a sensor that overlaps the windings of the associated coil is selected. In this example, the temperature sensor T7 is identified as the first temperature sensor and the temperature sensor T9 is identified as the second temperature sensor.

The control unit then initiates a heating cycle in which the first coil C3 and the second coil C4 are sequentially powered in order to raise the temperature of the inner ring to a set value, without exceeding a maximum allowable temperature difference between the outer ring and the inner ring. The signals from the identified first and second temperature sensors T7 and T9 are used as inputs for controlling the heating cycle.

In a further development, the control unit 30 is configured to verify that the correct coils have been selected as the first and second coils for heating the inner and outer rings respectively. This is done by verifying that the first and second temperature sensors are exhibiting an expected behavior.

Figure 3A:
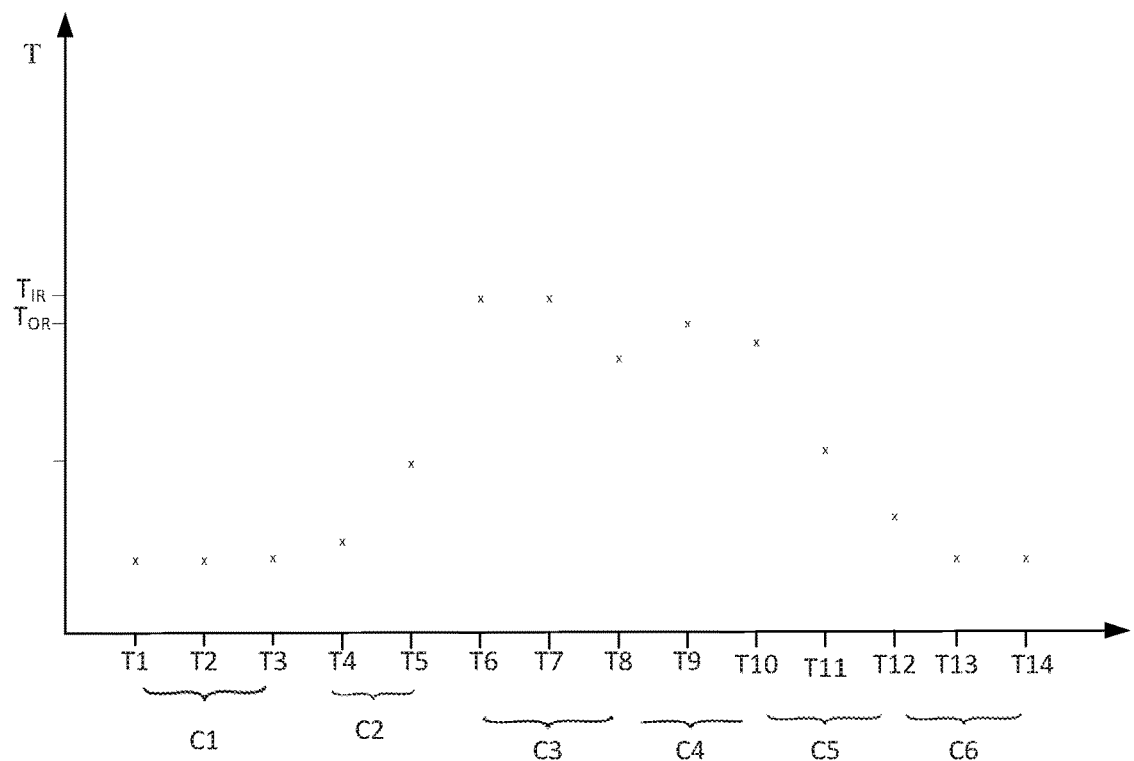
FIG. 3a shows an example of a temperature profile across the device that might be obtained when the correct induction coils have been selected to execute the heating cycle.

In one example, a temperature profile is obtained from the temperature sensors at a particular moment in time and the temperature signals from the identified first and second sensors are compared with the temperature signals from the sensors that are associated with other coils. An example of a temperature profile that could be measured for the arrangement shown in FIGS. 1a and 1b, after heating has commenced, is shown in FIG. 3a.

The temperature measured by sensor T7, associated with selected first coil C3, is assumed to be representative of the inner ring temperature TIR. If coil C3 is indeed inducing eddy currents in the inner ring 51, causing it to heat up, then TIR should be higher than the temperature measured by the sensors associated with a neighboring coil, which is also an inactive coil, i.e. coil C2. The temperatures measured by associated sensors T4 and T5 are indeed lower and coil C3 is verified as the coil which is heating the inner ring. Similarly, if the selected second coil C4 is indeed inducing eddy currents in the outer ring 52, causing it to heat up, then the temperature TOR measured by sensor T9, which is assumed to be representative of the outer ring temperature, should be higher than the temperature measured by the sensors associated with neighboring inactive coil C5. The sensor T10 is associated with coil C4 as well as coil C5. Consequently, it could be expected that the temperature measured by T10 is higher than the temperature measured by sensors T11 and T12 which are farther away from the active second coil C4. It can also be expected that the temperature measured by sensors T11 and T12 will be lower than TOR. One or both of these criteria may be used to verify C4 as the coil which is heating the outer ring. In the given example, the correct coils have been selected and the heating cycle is continued.

Figure 3B:
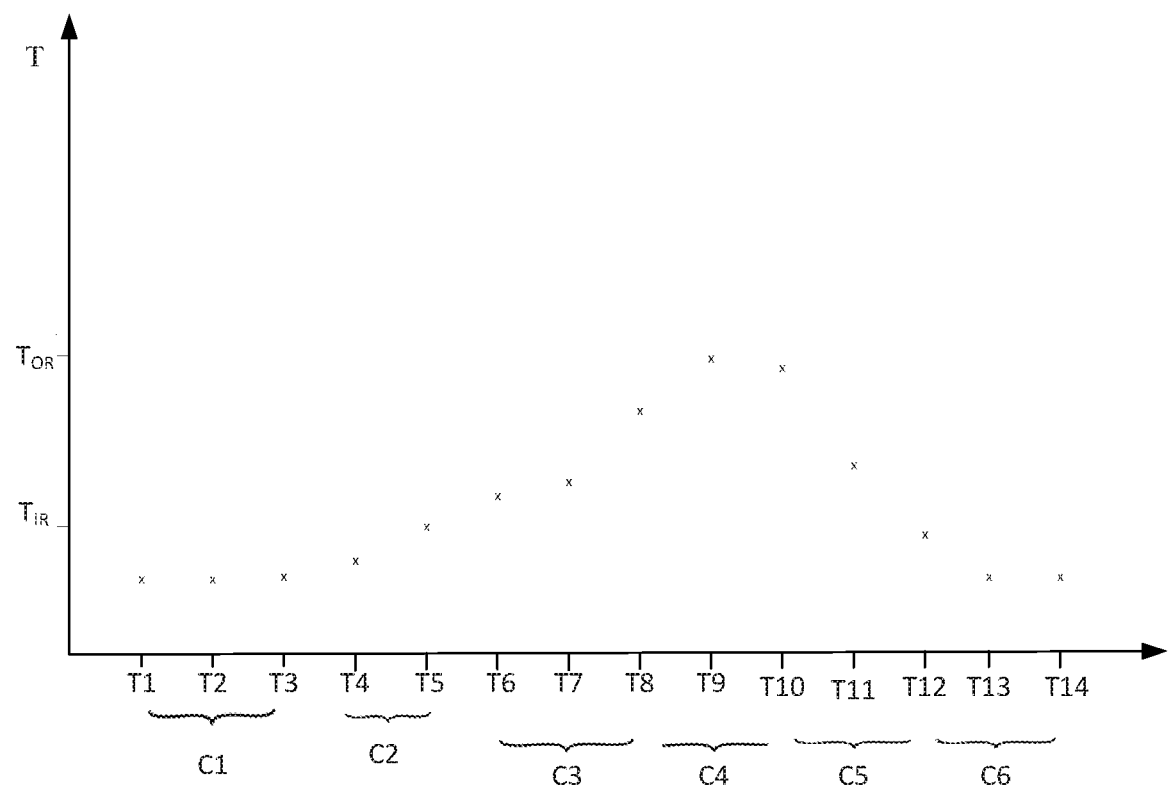
FIG. 3b shows an example of a temperature profile across the device that might be obtained when an incorrect induction coil has been selected to execute the heating cycle.

Let us now assume that coil C2 is incorrectly identified as the first coil for heating up the inner ring and that temperature sensor T5 is identified as the corresponding first temperature sensor for measuring the inner ring temperature. Coil C4 has been correctly identified and will begin heating the outer ring 52 (NB heating will stop if the temperature difference between the outer ring temperature TOR and the inner ring temperature TIR exceeds a predefined threshold of e.g. 30° C.) There may be a small degree of electromagnetic coupling between the coil C2 and the inner ring 51, causing some inductive heating. An example of a measured temperature profile is shown in FIG. 3b.

The measured inner ring temperature TIR should be higher than the temperature measured by the sensors associated with neighboring inactive coils C1 and C3. This is the case for the sensors T1, T2 and T3 associated with coil C1, but not for the sensors T6, T7 and T8 associated with coil C3. The control unit may also be configured to compare the assumed inner ring temperature TIR with the assumed outer ring temperature TOR, to identify an unexpected discrepancy. Consequently, coil C2 is deselected and a neighboring coil is identified as the new first coil. In this example, there is evidence to assume that coil C3 is the correct coil. The heating cycle will be re-initiated using the signal from sensor T7 as the inner ring temperature signal, and the verification process described with reference to FIG. 3a will confirm that the correct first coil has now been selected.

Additionally or alternatively, the control unit 30 may be configured to verify that the correct first and second coils have been selected by monitoring changes in the temperature signal from the sensors that have been identified as the first and second temperature sensors. If the correct coils have been selected, then powering of the coils should lead to an increase in temperature. The rate of rise in temperature may also be determined for each of the first and second temperature sensors and compared against each other. If, for example, the outer ring 52 of the bearing is heating up more quickly than the smaller inner 51, this could be an indication that the wrong coil has been selected as the first coil.

The control unit may further be configured to monitor the temperature signal from each sensor and to detect if a predetermined maximum threshold is exceeded. For example, if the bearing being heated is fitted with a metal shield to enclose the radial gap between the inner and outer rings, excessive heating of the shield might occur if the shield radially overlaps a coil. If the temperature measured by any of the sensors exceeds the threshold, the control unit may be configured to discontinue the heating cycle and issue a warning to the user, or at least deactivate the coil associated with the temperature sensor that has measured an unallowable temperature. Furthermore, the unit may be configured to select new coils as the first and second coils and to continue a new heating cycle when the measured temperature has fallen to an acceptable level.

A number of aspects/embodiments of the invention have been described. It is to be understood that each aspect/embodiment may be combined with any other aspect/embodiment. Moreover, the invention is not restricted to the described embodiments, but may be varied within the scope of the accompanying patent claims.

What is claimed is:

1. An induction heating device for heating a bearing having an inner ring and an outer ring, the device comprising:
    a support plate with an upper surface for receiving a side face of the bearing;
    a plurality of concentrically arranged induction coils provided at an underside of the support plate, each induction coil being connected to and selectively powered by a generator;
    a plurality of temperature sensors arranged on the upper surface of the support plate at different radial distances from a center axis (a) of the concentric coils, each coil being associated with one or more temperature sensors that overlap windings of the coil or which are in close radial proximity thereto;
    a control unit that controls the generator and receives and monitors a temperature signal from each of the temperature sensors, the control unit being configured to:
    receive and process a signal indicative of a load on each coil, when selectively powered, to identify a first coil that is electromagnetically coupled to the inner ring and a second coil that is electromagnetically coupled to the outer ring;
    select a temperature sensor associated with the identified first coil as a first temperature sensor for measuring the temperature of the inner ring;
    select a temperature sensor associated with the identified second coil as a second temperature sensor for measuring the temperature of the outer ring; and
    execute a heating cycle in which at least the first and second coils are controlled, based on the temperature signals from the first and second temperature sensors.

2. The induction heating device of claim 1, wherein each coil is associated with at least two temperature sensors.

3. The induction heating device of claim 1, wherein the temperature sensors are arranged in a straight line extending from the center axis (a) of the coils, to form a first set of temperature sensors.

4. The induction heating device of claim 3, further comprising one or more further sets of temperature sensors arranged in a straight line extending from the center axis (a), wherein each further set comprises the same number of temperature sensors as the first set, arranged at the same radial distance from the center axis as the corresponding sensors in the first set.

5. The induction heating device of claim 3, further comprising first, second and third sets of temperature sensors, wherein the control unit is configured to detect an offset of the bearing axis relative to the center axis (a), by comparing the temperatures measured by corresponding sensors in set that lie at the same radial distance from the center axis (a).

6. The induction heating device of claim 1, wherein the temperature sensors are executed as NTC resistors arranged on a strip that is affixed to the upper surface of the support plate.

7. The induction heating device of claim 1, wherein the control unit is configured to initiate the heating cycle and then verify that the correct coils have been identified as the first and second coils, by monitoring at least the temperature signals from the selected first and second temperature sensors, and determining if the monitored signals exhibit temperature behavior that would be expected if the inner and outer bearing rings are in electromagnetic coupling with the first and second coils respectively.

8. The induction heating device of claim 7, wherein the control unit monitors the temperature signal from each of the sensors to obtain a temperature profile across the support plate at a particular instant, and compares the temperature measured by the first and second temperature sensors against other measured temperatures within the obtained temperature profile, to determine if expected behavior is being exhibited.

9. The induction heating device of claim 7, wherein the control unit monitors changes in the signal from the first and second temperature sensors over time, to determine if expected behavior is being exhibited.

10. The induction heating device of claim 7, wherein the control unit is configured to continue the heating cycle with the identified first and second heating coils if the monitored temperature signals exhibit expected behavior.

11. The induction heating device of claim 7, wherein the control unit is configured to initiate a new heating cycle with a different first coil and/or a different second coil if the monitored temperature signals do not exhibit expected behavior.

12. The induction heating device of claim 1, wherein the control unit is configured to detect if any of the temperature sensors measures an excessive temperature that exceeds a predetermined maximum value and to deactivate at least the coil associated with the measured excessive temperature.

13. The induction heating device of claim 1, wherein the heating cycle executed by the control unit comprises powering of the identified first and second coils, to raise the temperature measured by the selected first temperature sensor to a predetermined value, without exceeding a maximum allowable temperature difference between the received signals from the selected first and second temperature sensors.

14. The induction heating device of claim 1, wherein the device comprises only one generator and the control unit is configured to power the identified first and second coils sequentially in order to execute the heating cycle.

* * * * *